June 10, 1969  T. J. MESH  3,448,895
PRE-SET AUTOMATIC DISPENSING SYSTEM
Filed March 1, 1967

INVENTOR.
THEODORE J. MESH

United States Patent Office 3,448,895
Patented June 10, 1969

3,448,895
PRE-SET AUTOMATIC DISPENSING SYSTEM
Theodore J. Mesh, Greensboro, N.C., assignor to Gilbert
 & Barker Manufacturing Company, Greensboro, N.C.,
 a corporation of Delaware
Filed Mar. 1, 1967, Ser. No. 625,897
Int. Cl. B67d 5/04; G01f 11/00
U.S. Cl. 222—20                                        10 Claims

ABSTRACT OF THE DISCLOSURE

This invention relates to a dispensing system for use in automobile service stations and, more particularly, to a pre-set dispensing system through which automobile service station customers may serve themselves by operating an automatically controlled pre-set dispensing system designed to deliver a selected quantity of fluid which may be programmed for delivery at the pump site by the station operator or cashier at a remote location.

Background and brief summary of invention

In conventional service station systems for dispensing gasoline, it is usual to have each car serviced personally by an attendant. This operation, however, is sometimes costly, particularly when the staff maintained is of sufficient proportion to insure prompt attention to all customers and their needs. The stations attempting to operate with a skeleton work force find that when the staff maintained is not sufficient to give immediate attention to all customer needs, the customers are often required to wait for seemingly long periods of time and may sometimes become dissatisfied and even leave without receiving service or purchasing automotive commodities.

The present invention has been developed to overcome these disadvantages by replacing the station attendant or helper with an appropriate self-service dispensing system. Through use of the apparatus herein disclosed, the servicing of motor vehicles by making gasoline available to the driver of a vehicle in precise quantities is provided, the operation being controlled by the station operator or cashier situated inside the structure of the facility. Thus a knowledgeable station attendant maintains a vigilant record of the quantity of products sold and receives the monies required in payment.

The present system has been found particularly advantageous for use in conjunction with self-service food markets which primarily specialize in the sale of groceries and other consumable items. The cashier located at the cash register or check-out stand of the establishment has positioned before him the console control unit for the pre-set system which will, when initiated by the attendant, automatically program the gasoline pumps located outside the building at the automotive servicing area to dispense a predetermined amount of gasoline upon the actuation of the gasoline pump switch by the customer. Customers within the self-service market are thus able to pay for a precise amount of gasoline at the time they purchase groceries and the like and merely trigger the pump switch outside the store to dispense that precise quantity into the automobile gasoline tank.

Additional flexibility in the disclosed system is attained by providing means for filling the customer's tank without knowledge or regard of the precise amount needed to complete that filling, and the price and quantity will then be recorded at the system console unit on a totalizing counter inside the housed facilities next to the cashier. The flexibility feature provides those customers desiring a full tank of gasoline the opportunity to fill their tank prior to entering the store so that the amount may be recorded therein and simply added to their other bill for groceries and supplies.

A number of embellishments are available in the present system, some directed at devices for establishing personal contact between the attendant or cashier and the customer and some designed to permit the interchange of colloquialisms or questions and instructions. Advertisements may also be presented to the customer in a manner suited to winning his approval and acceptance of the products promoted. Additionally, printed operational instructions may be positioned adjacent the dispenser for the convenience of customers to insure against malfunctions and improper operations.

With the foregoing in mind, it is, therefore, a primary object of the present invention to provide an automatic pre-set dispensing system which will permit the delivery of a predetermined quantity of gasoline to the customer's tank upon the triggering of the pump switch by the customer and the termination of that delivery when the selected quantity has been dispensed.

Another object of the present invention is to provide an automatic pre-set dispensing system of the type described having flexibility to permit delivery of an indefinite quantity of gasoline for those customers who desire to purchase a full tank of gasoline.

Still another object of the present invention is to provide an automatic pre-set dispensing system having a novel slow-down feature which insures that proper computer and console price registration is accomplished and that motor drift or over-run is eliminated.

Yet another object of the present invention is to provide an automatic pre-set dispensing system having a totalizing counter associated with the system for recording and totalizing the individual quantities of fluid dispensed by each setting of the console or each customer serviced.

A further object of the present invention is to provide an automatic pre-set dispensing system embodying signal generating means to cause the discharge of selected capacitors for slowing down the dispensing system when a predetermined indicated amount remains and then terminating the dispensing operation upon completion of the selected and delivered quantity of dispensed fluid.

These and other objects of the present invention will become more apparent from a consideration of the accompanying drawings constituting a part hereof in which like characters of reference designate like parts.

Figure description

Figure 3:
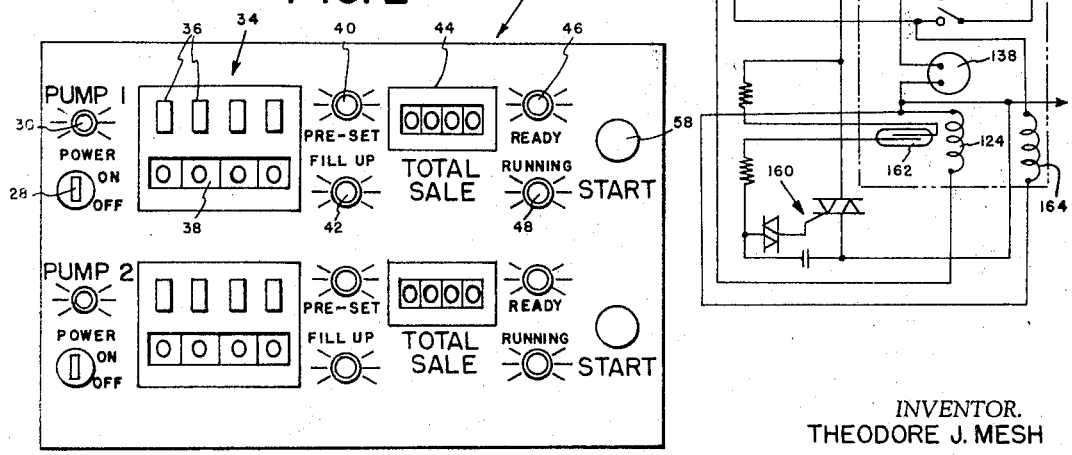

FIG. 3 is a plan view of the operating surface of the console control unit associated with the present pre-set automatic dispensing system which is operated by the cashier at a location remote from the dispenser to program a predetermined quantity of gasoline for self-service dispensing by the customer, the unit having associated means to record and totalize the individual operations of the pre-set system.

Detailed description of the invention

Figure 1:
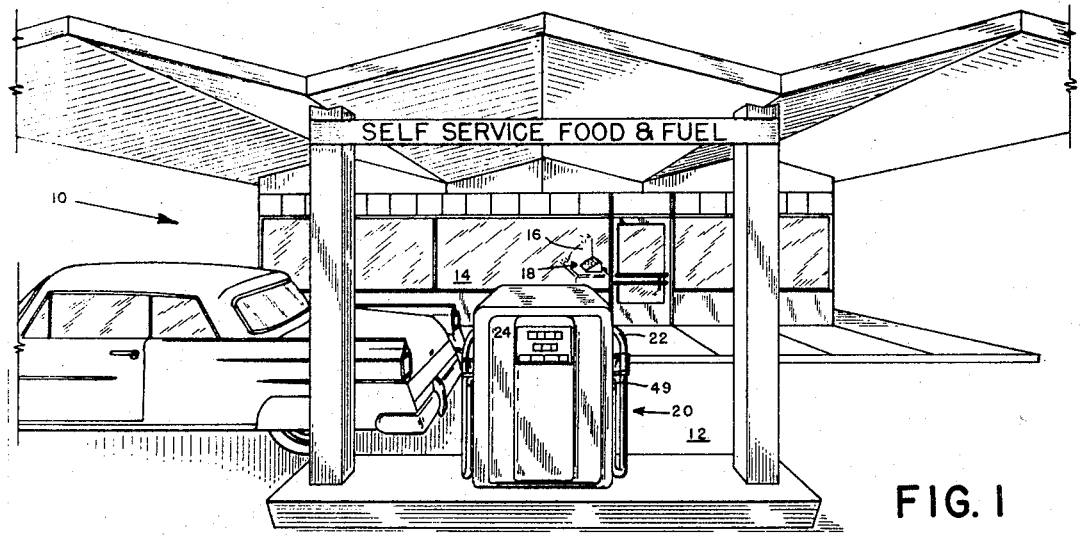
FIG. 1 is a general perspective view of a self-service food and fuel establishment utilizing the automatic pre-set dispensing system embodied in the present invention.

Referring now to the drawings and particularly to FIG. 1, an automotive service area shown is combined with a self-service food store and generally designated 10. The facility has a main service location 12 adjacent a windowed building front 14 through which an operator within the building can manitain an uninterrupted view of the service location which constitutes a convenient facility for efficiently utilizing the present invention. The attendant or cashier handles transactions within the food center at a cash register 16 beside which is positioned a console control unit generally designated 18, the top of which is particularly illustrated in FIG. 3. The positioning of an operator or attendant within the glass structure of the building permits constant surveyal and visual control of the automatic dispensing operation and affords maximum flexibility, control and safety in the operation and maintenance of such a system.

The self-service food and fuel station 10 is provided with one or more dispensers generally designated 20, the components of which include a delivering nozzle 22, a computer, the indicating portion of which is designated 24, a pump and solenoid valve, neither of which is specifically shown in FIG. 1, all combining to provide fluid flow from a reservoir through the nozzle 22 and into the customer's automobile gasoline tank. The automatic pre-set dispensing system herein disclosed forms an independent device having associated circuitry which interconnects with the operation of the conventional dispenser 20 to control the dispensing of a pre-set quantity of fluid by the station attendant upon payment thereto by the customer of a sum sufficient to cover the cost of the dispensed product.

As is apparent from FIG. 1, by using the console 18, a cashier or station attendant has complete control over the dispensing of fuel products through a remote fueling station operated by a customer who effects delivery. The remote control unit makes for a more reliable system since the clerk operating the console is usually more knowledgeable and aware of the services offered and the average motorist is more safety conscious in fuel handling than the average service station attendant who has become rather complacent. Similarly, in case of a fire or accident, the clerk or cashier would not be incapacitated as would be an attendant and consequently would be better able to take emergency measures for the protection of the customer and the premises.

The console is constructed for counter top mounting and has a rectangularly shaped top, convenient dimensions of which usually approach a depth of ten inches, a width of fourteen inches and a height of ten inches.

The console unit has an emergency switch 26 which controls all power to the console and pumps since it is located directly in the energized power supply lead. The top surface of the unit is divided into one or more sections according to the number of dispensers controlled, the top illustrated in FIG. 3 having two sections which therefore control two separate dispensers. For the purpose of explanation and illustration, only one section and its operation will be herein described, but it is to be understood that all sections operate similarly and that there is no limitation as to the number of sections that can be installed and maintained at a particular facility.

A key switch 28 is positioned on the surface of the console unit and is in series with the power supply to the particular console section involved. A POWER-ON light 30 is connected to the key switch 28 to indicate when power is being supplied to that console section.

A mechanically operated electrical control generally designated 32 (FIG. 2) has an indicator 34 positioned in the console surface for indicating and storing information commensurate with the total quantity of a fluid to be dispensed. This is, in essence, a pre-set counting device which allows the operator to preselect the amount of fuel to be delivered in monetary units preferably by positioning a number of thumbwheels 36 so that the correct monetary amount is reflected by the indicator computer 38 prior to the commencement of the dispensing operation. A conventional Durant electromechanical counter has been found to be suitable for use in the present system, as it generates a control signal after the selecting and storing portion of the mechanism has received delivery signals commensurate with the total quantity of fluid to be dispensed. Receipt of the control signal generated by the counter will disable the pump and terminate the dispensing operation as will be hereinafter more particularly described.

A PRE-SET light 40, when lit, indicates that there is a definite amount set into the counter, and this light will be extinguished after delivery of the pre-set amount. A FILL-UP light 42 is energized when an indefinite amount of fuel is requested as in the case of a customer desiring a full tank of gasoline but being unaware of the exact amount of fuel that will be required to fill the tank.

A TOTAL SALE counter 44 gives a duplication of the sale on the counter of the dispenser. This counter may be used as a totalizing counter to give one total of the entire individual operations experienced over a period of time, or it may be reset by push-button means and restarted whenever desired.

READY light 46 and a RUNNING light 48 are located adjacent the counter 44 proximate a START push-button switch 58. The START switch closes a series of relays and furnishes power to the pump switch which also lights the READY light thus indicating that power is available to the pump which is then ready to operate in a conventional manner. When the nozzle 22 is removed and the pump switch or trigger 49 is depressed, the pump RUNNING light 48 comes on indicating to the operator that the customer is taking delivery.

The Durant pre-set counter previously mentioned has been slightly modified in the present system from its normal functioning to provide a slow-down operation near the end of the selected dispensing cycle controlled by the attendant. The Durant counter normally generates a control signal when the indicator reaches the zero position and the dispensing operation is terminated. By modifying the counter, a signal can also be generated at the five cent position to slow down delivery rate and avoid motor overrun which would cause the delivery-responsive computer to reflect a greater monetary value than the value of the gasoline which was actually received. By initiating the slow-down operation through the modified Durant pre-set counter, the solenoid valve of the pump is closed so that dispensing of the last five cents worth of fuel takes place through a small copper tube thus reducing the flow of fluid and making the lesser amount of fluid being passed through the tubing much easier to control. The result is that no motor overrun and responsive computer overrun is experienced and the indicators on the dispensing units are compatible with price and quantity reflections.

Figure 2:
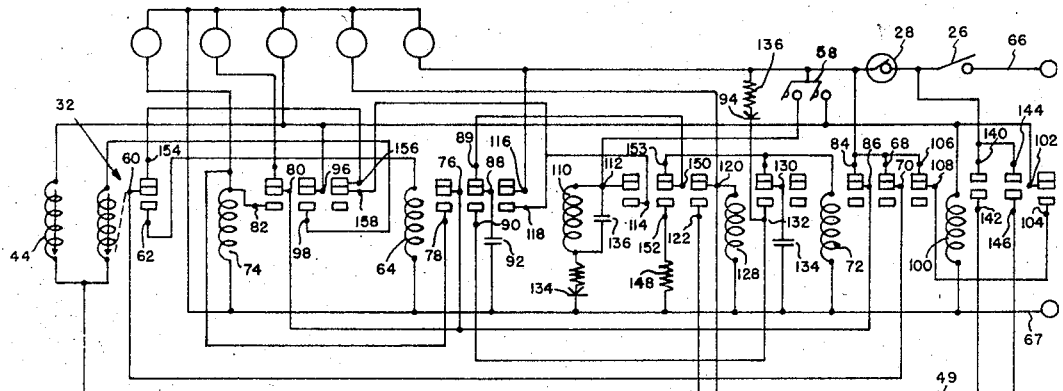
FIG. 2 is a schematic diagram of the electrical circuit associated with the present invention showing the electrical control and operation of the pre-set system in conjunction with the dispenser including the pump, solenoid valve and computer.

The specific operation of the system will now be explained by referring to the schematic diagram of FIG. 2 after which alternative operations of the systems will be particularly pointed out which enhance the flexibility of the concept.

When a monetary amount representing a definite quantity of fluid is pre-set by turning the counter thumbwheels 36, pre-set contacts 60 and 62 are made and relay 64 is energized, the energizing current path being from power supply lead 66 through the normally closed contacts 68 and 70 of relay 72, through pre-set contacts 60 and 62, and through the winding of relay 64 to neutral or ground 67. Relay 74 is then energized via contacts 76 and 78 of relay 64, relay 74 continuing to hold through its own contacts 80 and 82 and through contacts 84 and 86 of relay 72, even though relay 74 may subsequently be de-energized.

The closing of contacts 88 and 90 of relay 64 causes a capacitor 92 to be charged from the line voltage through rectifier 94 to approximately 160 volts D.C. Relay 74 is used to channel pulse power to the pre-set counter 32 through contacts 96 and 98 but only during the pre-set operation while power for the totalizer 44 is available whenever the power relay 100 is energized.

When the START button 58 is depressed, power relay 100 is energized and holds by its auxiliary contact 102 and 104 and normally closed contacts 106 and 108 of relay 78. Operation of the START button also energizes solenoid valve relay 110 which then holds in by its own contacts 112 and 114 and contacts 116 and 118 of relay 64. Contacts 120 and 122 of relay 110 control the solenoid valve 124 operating a fluid control valve permitting the valve to close after the pump switch 49 has been opened.

When the pump switch 49 is closed, relay 128 is energized, and its contacts 130 and 132 cause capacitor 134 to charge from line voltage through rectifier 94. A resistor 136 of approximately 100 ohms is wired in series with rectifier 94 to limit the charging current.

In operation, several of the relays in the circuit described are held in by their own contacts, having been picked up by operation of the START button, as for example, relay 100. Relay 72 functions as a shutdown switch since any operation of that relay, even momentarily, will drop out relay 100 and other self-held relays by interrupting their holding circuit. It will be obvious that relay 72 may be pulsed or momentarily operated by discharging either capacitor 92 or 134 into the relay coil as either of these capacitors hold sufficient charge to energize relay 72 for about a second, the result of such discharge being that the hold system is shut down and remains so until another START button operation is made. Thus, opening the pump switch 49 at any time discharges capacitor 134 into the coil of relay 72 through contacts 130 and 132 of relay 128 causing a de-energization or shut-down. After approximately one second, relay 72 is re-energized.

When counter 32 has moved from the pre-set quantity and counted down to the zero position, pre-set contacts 60 and 62 are pulsed open, thus de-energizing relay 64, which then discharges capacitor 92 into the coil of relay 72 causing the shut-down.

To embody the modified Durant counter in a manner to effect the slow-down operation herein described, the first opening of pre-set contacts 60 and 62 (at the five cent indication) must not operate the shut-down relay 72. However, at the second opening of the counter 32 (at the zero position), relay 72 will be operated to shut down the dispensing system. This particular operation is accomplished by introducing an RC time factor into the operation of relay 110, first by operating it on direct current by means of rectifier 134 and then by shunting it with a capacitor 136. This network delays the opening of relay 110 after it is deenergized by a time interval of about one-tenth of a second, and it is significant that this interval must be slightly less than the interval between successive pulses received from the dispenser 20 since this represents the time the preset contacts 60 and 62 will be opened at the five cent position. This time factor can be easily calculated by multiplying the highest price of gasoline per gallon that is anticipated by the pump delivery rate of twelve gallons per minute and dividing by sixty seconds, this resulting in the figure of approximately six pulses per second. Thus the time interval should be under one-sixth of a second, and since normal relay opening time is usually about .05 second, this is an appreciable additional delay. The time factor can be controlled accurately by proper selection of the size of capacitor 136, values of 5 to 10 microfarads having been found satisfactory.

When pump switch 49 is closed, fluid delivery may be made since the pump motor 138 will start through contacts 140 and 142 of relay 100. The valve operating solenoid 124 will open through contacts 144 and 146 of relay 100, the pump switch contacts, and contacts 120 and 122 of relay 110.

When the pre-set amount has nearly been delivered and the last five cent point is reached, pre-set contacts 60 and 62 open and relay 64 is de-energized. Its contacts 116 and 118 open to drop out the solenoid valve relay 110, but since relay 64 starts to open first, and since relay 110 is delayed in drop out for about one-tenth of a second, the charge on capacitor 92 is discharged through a resistor 148 in about one millisecond. The operational sequence is that relay 64 is de-energized and its contacts 88 and 90 open while 88 and 89 close. Contacts 150 and 152 of relay 110 have been closed and now remain closed for approximately one-tenth of a second, long enough for capacitor 92 to discharge through contacts 88 and 89 of relay 64 and through still closed contacts 150 and 152 of relay 110 into resistor 148 in about one millisecond. Then approximately one-tenth of a second later, relay 110 opens, thus opening contacts 150 and 152 of relay 110 and closing contacts 153 and 150 of that same relay. With relay 110 de-energized, fluid delivery continues at a very slow rate through a small copper tube (not shown). As the four cent position is reached on counter 32, pre-set contacts 60 and 62 reclose and relay 64 is once again energized thus recharging capacitor 92. As the zero money position is then reached by counter 32, pre-set contacts 60 and 62 open once more and relay 64 is again de-energized. This time capacitor 92 discharges through contacts 88 and 89 of relay 64 and contacts 150 and 153 of relay 110 to pulse relay 72. This opens contacts 84 and 86, contacts 68 and 70, and contacts 106 and 108 of that relay momentarily, thus de-energizing all controlled relays which remain in that condition. This is the end of the cycle and relay 74 has remained energized until the end of the cycle thus insuring continued pulsing of the pre-set counter.

In the event that the customer controlled pump switch 49 is opened at any time before the cycle is completed, relay 72 is pulsed by the de-energization of relay 128 and a shut-down occurs. This system can, however, be restarted with the depression of the START button 58 and operation will resume at the remaining pre-set value.

In the event a fill-up operation is desired, the pre-set counter remains at zero which causes its contacts 60 and 62 to remain open but contacts 60 and 154 are closed. When the START button 58 is depressed, relay 72 is energized as before, relay 110 is energized and holds through contacts 156 and 158 of relay 74, contacts 60 and 154 of the pre-set counter and contacts 68 and 70 of the shut-down relay 72. The pre-set counter 32 does not operate and delivery may continue indefinitely.

Opening the pump switch 49 causes a shut-down through relays 128 and 72. In all variations of operation, opening the pump switch 49 stops the motor and drops out the valve operating solenoid 124 by direct action of the switch. The pulse system described re-sets the relays so that another START button operation is necessary to restart delivery as merely reclosing the pump switch 49 will not accomplish this.

Pulsing of the Durant counter 32 and totalizer 44 is accomplished by means of a solid state amplifier conventionally known as a Triac generally designated 160 which is triggered by a glass-enclosed magnetic reed switch 162 that is opened and closed by ten magnets within the penny wheel (not shown) of the computer in a manner which is well known in the art. Pulsations thus initiated and amplified by the Triac are fed to the counters and serve to trigger these mechanisms appropriately in either count-down or totalizing operations.

Thus, in summary, the improvement disclosed herein for automatically controlling the dispensing of a pre-set quantity of fluid includes a counter 32 for indicating and storing information in accordance with the total quantity of fluid to be dispensed which is responsive to pulses generated by a reed switch 162 and Triac 160 operatively connected to the pump and computer, which pulses are delivered according to incremental quantities of fluid passing through the solenoid operated valve to the nozzle 22, the generated signals being fed to the counter 32 to allow that mechanism to count down from the total positioned therein by the attendant or cashier. Additionally, the counter contains components which are operable with the count down mechanism and generates a control signal for opening and closing selective contacts, these signals appropriately placed at the slow-down and termination indicating positions on the counter. When the counter senses and indicates by control signals that these locations have been reached, relaying schemes shown particularly in FIG. 2 of the drawing are responsive to that signal and serve to disable the pump and thereby terminate delivery of dispensed fluid.

The by-pass flow tubing and by-pass flow controls associated with the circuitry of FIG. 3 involve modifying the Durant counter so that a control signal is generated when the indicating portion of a counter has received a number of delivery signals approaching but not less than the number commensurate with the total quantities of fluid to be dispensed. The system then operates in response to the generated signals from the reed switch 162 and Triac 160 so that the solenoid operated valve is closed and fluid is dispensed through the by-pass flow tubing to the nozzle 22 at a reduced rate until the dispensing operation has terminated through the receipt of the control signal by the terminating signal responsive means.

The system disclosed herein includes as a part of its circuitry the provision of a relaying scheme which is independent of the pre-set operation for dispensing an indefinite quantity of fluid. A totalizing counter 44 is provided and is adapted to record and totalize indefinite quantities of fluid dispensed as during the fill-up operation along with pre-set quantities of dispensed fluid indicated by each setting of counter 32.

The indicating and storing portion of the Durant counter 32 comprises a mechanically operated electrical control for selectively positioning and coordinating switch actuation in response to normal computer operation, and the signal generating means used to operate the counter includes the magnetic reed switch 162 which generates signal pulses in response to the movement of the penny wheel of the computer as the dispenser pump is operated. Additionally, the Triac solid state amplifier 160 is recommended for magnifying and transmitting the pulses to the indicating and storing means of counter 32. This counter has disabling characteristics in the form of a plurality of contacts associated with the counter portion 38 of the device which open in response to a control signal, that signal triggering a selected capacitor which discharges thereby pulsing appropriate relays for deenergizing the dispensing apparatus.

A solenoid 164 is used to operate a fluid control valve (not shown) for opening and closing the by-pass flow tubing, the solenoid being energized during the operation of the pump motor 138 to hold open the valve and de-energized when the pump motor is off so that the valve is closed. Thus the by-pass flow tubing actually acts in combination with the conventional nozzle 22 during the normal dispensing operation and acts alone during the slow-down period. Providing a solenoid operated valve for the by-pass tubing also prevents any flow back from adjacent pumps in a single station area that might otherwise occur when one pump is operated alone.

A number of embellishments or innovations are available to streamline the present automatically controlled pre-set dispensing system in conjunction with a self-service market and the like, including the provision of an intercommunication system tying the pump site directly to the cashier location so that social and instructional interchange is available between operator and customer, and pneumatic change making apparatus for the convenience of the customer so that change can be made directly by the cashier from the cash register to the customer at the pump site without the necessity of the customer entering the facilities. Additionally, the system could be adapted to the dispensing of other automotive products including motor oil, fuel oil, anti-freeze and the like.

Obviously, many modifications and variations may be made in the construction and arrangements of the pre-set counter, the totalizing counter and the relaying network embodied in the circuitry thereof, as well as other phases of the present inventive concept in light of the above teachings without departing from the real spirit and purpose of this invention. Such modifications as well as the use of equivalents to those herein illustrated and described are reasonably included and contemplated.

I claim.

1. In an apparatus for dispensing fluid from a reservoir, the apparatus including a delivering nozzle, a computer, a pump and a solenoid operated valve providing an opening through which a selected quantity of fluid may flow from the reservoir to the nozzle, the improvement for automatically controlling the dispensing of a pre-set quantity of fluid, said improvement comprising: means for indicating and storing information commensurate with the total quantity of fluid to be dispensed; signal generating means operatively connected to the pump and computer for generating signals commensurate with the delivery by the pump of incremental quantities of fluid through the valve to the nozzle and applying the generated signals commensurate with the delivery of incremental quantities of fluid to said indicating and storage means to count down from the total stored therein; means for generating a control signal when the indicating and storing means has received delivery signals commensurate with the total quantity of fluid to be dispensed; and means responsive to the generation of said control signal for disabling said pump thereby terminating delivery of fluid, said disabling means including contacts associated with said indicating and storing means opening in response to receipt of said control signal, a capacitor chargeably controlled by said contacts, and a relaying means for de-energizing the dispensing apparatus when pulsed by said capacitor upon opening of said contacts.

2. The apparatus of claim 1 wherein the nozzle has by-pass flow means and by-pass flow controls associated therewith, said controls further comprising: means operable with the valve for generating the control signal when the indicating and storing means has received a number of delivery signals approaching but less than the number commensurate with the total quantity of fluid to be dispensed and closing the valve in response to the generated signal so that fluid is dispensed through the by-pass flow means to the nozzle at a reduced rate until the dispensing operation is terminated through the receipt of a control signal by the terminating signal responsive means.

3. The apparatus in claim 1 further comprising: means independent of said pre-set improvement for dispensing an indefinite quantity of fluid.

4. The apparatus in claim 1 further comprising: totalizing means associated with the pump, computer and said indicating and storing means for recording and totalizing the individual quantities of fluid dispensed by each setting of the indicating and storing means.

5. The apparatus of claim 1, said indicating and storing means comprising a mechanically operated electrical control for selective adjusted positioning and coordinated switch actuation in response to normal computer operation, said signal generating means including a magnetic reed switch generating signal pulses in response to the movement of the computer as the pump is operated, and amplifier means for magnifying and transmitting the pulses to the indicating and storing means.

6. The apparatus of claim 2, said signal generating and valve closing means including a time delay network and discharging capacitor adapted to effect the closing of the solenoid valve without affecting the operation of the pump and said indicating and storing means.

7. The apparatus of claim 3 further comprising: totalizing means associated with the pump, computer and said indicating and storing means for totalizing and recording the individual quantities of fluid dispensed by each setting of the indicating and storing means.

8. The apparatus of claim 4, said totalizing means also adapted to totalize and record indefinite quantities of fluid dispensed by the indefinite dispensing means.

9. The apparatus of claim 7 further comprising: means independent of said pre-set improvement for dispensing an indefinite quantity of fluid; totalizing means associated with the pump, computer and said indicating and storing means for recording and totalizing the individual quantities of fluid dispensed by each setting of the indicating and storing means, said means also adapted to record and totalize indefinite quantities of fluid dispensed within pre-set quantities by the indefinite dispensing means.

10. The apparatus of claim 9, said indicating and storing means comprising a mechanically operated electrical control for selective adjusted positioning and coordinated switch actuation in response to normal computer operation, said signal generating means including a magnetic reed switch generating signal pulses in response to the movement of the computer as the pump is operated, and amplifier means for magnifying and transmitting the pulses to the indicating and storing means.

References Cited
UNITED STATES PATENTS

| | | | |
|---|---|---|---|
| 2,846,119 | 8/1958 | Robbins | 222—20 |
| 3,353,710 | 11/1967 | Romanowski | 222—20 |

ROBERT B. REEVES, *Primary Examiner.*

H. S. LANE, *Assistant Examiner.*

U.S. Cl. X.R.

222—34, 76